F. G. BLESSEN

HARVESTER

Filed May 10, 1920

Witness

Scott S. Morrison

Inventor

F. G. Blessen.

By Arthur H. Sturges.

Attorney

F. G. BLESSEN

HARVESTER

Filed May 10, 1920

Witness
Scott S. Morrison

Inventor
F. G. Blessen.
By Arthur H. Sturges.
Attorney

Patented June 5, 1923.

1,457,341

UNITED STATES PATENT OFFICE.

FREDERICK G. BLESSEN, OF CRESTON, NEBRASKA.

HARVESTER.

Application filed May 10, 1920. Serial No. 380,168.

*To all whom it may concern:*

Be it known that I, FREDERICK G. BLESSEN, a citizen of the United States, residing at Creston, in the county of Platte and State of Nebraska, have invented certain new and useful Improvements in Harvesters, of which the following is a specification.

The present invention relates to harvesters, and more particularly to shock formers for operation upon wheat and similar grain.

An object of the present invention is to provide a wheat shocker embodying features wherein may be eliminated the use of the ordinary tie rope used for holding the bundles together when they are delivered in shock form on the ground.

Another object of the invention is to provide a grain shocker wherein the bundles may be suitably grouped together and delivered to the ground in such groups and held in a novel arrangement with respect to each other so as to not only hold together in the form of a shock when delivered to the ground but also in positions to ward off rain and moisture which otherwise would collect in the grain, causing the same to become mildewed and spoiled.

A further object is to provide a grain shocker which is capable of operation to stack and deliver bundles of the grain as fast as the bundles may be delivered from the reaper and binder.

A still further object is to provide a relatively light and easily operated machine by use of which considerable saving in labor, time, and expense may be effected, and which may be used by farmers without depending upon labor conditions for preserving the wheat until such time as the grain is to be thrashed from the straw and chaff.

A still further object of the invention is to provide a grain shocker comprising relatively few movable parts and which does not require the skill and labor ordinarily exercised in the use of machines in present day use.

The above, and various other objects, and advantages of this invention will be in part described in, and in part understood from, the following detailed description of the present preferred embodiment, the same being illustrated in the accompanying drawings, wherein—

Referring to the drawings, wherein like parts are designated by similar numerals of reference throughout the several views, 20 and 21 designate a pair of frame bars which in plan are substantially U-shape, and the bar 21 is of less length and curvature than the bar 20 to form inner and outer bars for the frame. The curved or intermediate portions of the bars 20 and 21 extend forwardly of the machine and the free ends of the frames terminate at the rear end of the machine. Braces 22, in the form of straps or plates, connect together the spaced-apart rear ends of the bars 20 and 21. An upwardly-arched cross brace 23 joins the rear side portions of the frame and is of sufficient height to admit the passage of a shock therebeneath when delivered from the machine. The frame is also reenforced by an intermediate cross brace 24 and a sheet metal or otherwise suitably formed platform 25 which is secured over the bars 20 and 21 between the intermediate cross brace 24 and the forward end of the frame. The frame is provided with a forward projection 26 which is also preferably substantially U-shape with the free ends of the projections converging rearwardly and being bolted or otherwise suitably secured to the cross brace 24. The converging ends of the projection 26 are preferably arched downward to accommodate mechanism hereinafter set forth, and the projection 26 is also bolted or riveted to the forward end of the main frame. The projection 26 carries a bearing 27 in which is mounted a caster wheel 28 for supporting the forward end of the frame. Connected to the projection 26 is also a tongue 29 having an opening 30 in its free end admitting of the attachment of the tongue to a binder and reaper, or other suitable machine from which the bundles of grain may be delivered. The tongue 29 carries a brace bar 31 having a hooked portion 32 at its inner end adapted to be selectively engaged in a number of openings 33 formed in the inner end of the tongue 29 to vary the effective length of the brace 31. The free end of the tongue 29 is adapted to be bolted to the tongue of the binder, and the rod 31 is also adapted to be bolted to the tongue for suitably bracing the latter and holding the shocker at the desired distance from the side of the binder and reaper.

The rear end of the frame is supported upon a pair of wheels 34 and 35. The wheels are mounted on stub shafts 36 and 37, respectively, and the wheel 34 operates as an idler for supporting the adjacent side of the frame, while the wheel 35 constitutes a traction wheel and is utilized in driving the several mechanisms of the machine. Mounted on the shaft 37, and preferably at the inner side of the wheel 35, is a sprocket wheel 38, the hub portion of which forms one part of a clutch 39 slidably mounted on the shaft 37 and operated by the usual clutch lever 40 for locking and releasing the sprocket wheel 38 relatively to the shaft 37. A chain 41 is trained over the sprocket wheel 38 and carried forwardly to a sprocket wheel 42 mounted on shaft 43 journaled transversely across the under side of the frame and equipped with a pair of freely rotatable bevel pinions 43', having clutch portions at their hubs adapted to alternately interlock with clutches 44 and 45 keyed upon the shaft 43. The pinions 43' mesh with a bevel gear wheel 46 carried upon the lower end of a vertical shaft 47, which rises through the platform 25 and is journaled at its upper end in a brace arm 48 which projects forwardly from an upwardly tapering post 49 carried upon the intermediate portion of the frame and supported directly upon the cross brace 24. The clutches 44 and 45 are connected by fork arms 50 to opposite ends of a sleeve 51 slidable upon a transverse guide rod 52 secured across the under side of the frame. The sleeve 51 is normally and yieldingly held toward one side of the frame by a spring 53 for normally interlocking the clutch 44 to drive the shaft 47 in one direction. The other end of the sleeve 51 is connected to a flexible means 54, such as a cord, which is carried over pulleys 55 arranged at opposite sides of the frame and in position for carrying the free end of the connectors 54 to the rear end of the machine.

The shaft 47 carries near its lower end, and above the platform 25, a movable circular platform 56, having preferably a serrated upper surface upon which the bundles of wheat are adapted to be placed. The shaft 47 is also provided in suitably spaced relation above the platform 25 and from each other, with one or more toothed wheels 57, the teeth of which are adapted to engage in the stems of the grain and insure the carrying of the bundle about the shaft 47 on the rotatable platform 56. This mechanism constitutes the feeder for conveying the bundles of grain into the shock forming mechanism. This feeding mechanism is adapted to deliver the bundles of grain first to one side of the machine by rotation of the shaft 47 in one direction through the clutch 44 and subsequently, when the first side of the machine is loaded to capacity with bundles, to feed the bundles to the other side of the machine by operation through the clutch 45 and by a consequent reverse movement of the shaft 47.

It will be noted that the toothed wheels 57 are of consecutively decreasing diameter as compared to each other and to the revoluble platform 56, so that the bundles of grain are supported in an inclined position upon the platform 56 and are adapted to tilt toward the axis of rotation, or the shaft 47, particularly when the bundles are fed to the guides, as will be pointed out.

The post 49 is substantially triangular in shape and is secured crosswise of the machine with its opposite sides converging upwardly to the brace 48. The post 49 carries a number of forwardly projecting guides 58 which are preferably of rod form bent U-shape with the ends of the rods secured to the opposite sides of the post 49 and with the rounded or bent intermediate portions of the rods extending beneath the respective toothed wheels 57 and forwardly of the shaft 47. The rods 58 are arranged preferably in parallelism with each other and consequently the lower rod has its side arms spaced apart a greater distance than is the side arms of the upper rod. This provides an inwardly inclined rack or support upon which the bundles of wheat may rest with their upper ends leaning toward each other.

For the purpose of guiding the bundles onto the rods 58 and holding them against the rods as the bundles are fed rearwardly, outer guide rods 59 are arranged along the opposite sides of the machine in suitably spaced relation from the rods 58. These outer rods 59 are supported at their forward ends upon upwardly converging posts 60 carried upon the forward end of the machine in advance of the turning platform 56, so as to hold the bundles delivered to the platform from accidental displacement from the machine. The rods 58 and 59 form throats at opposite sides of the machine, and the throats are inclined with respect to their vertical axes so as to at all times during the feeding of the bundles hold the same with their upper ends inclined toward the central vertical plane of the machine. The rods 59 extend to the rear end of the machine where they terminate in upwardly and inwardly stepped relation with inturned ends forming stops 61 for receiving the rearmost bundles and holding the same with their upper ends inclined not only inwardly but also forwardly. This stepped relation of the stops 61 is adapted to provide a finished shock with its rear exterior surface sloping downwardly toward the base of the shock to thus shed rain and the like which falls upon the complete shock. The rear ends of the rods 59 are supported upon upwardly converging standards or posts 62, which are preferably turned inwardly at their lower ends and slotted for the reception of securing bolts 63, which not only hold the posts 62 rigidly in position, but which also admit and facilitate adjustment of the posts 62 toward and from each other to vary the width of the throat at opposite sides of the machines and to thus vary the width of the shock as is found desired.

Figures 7, 8, 9:
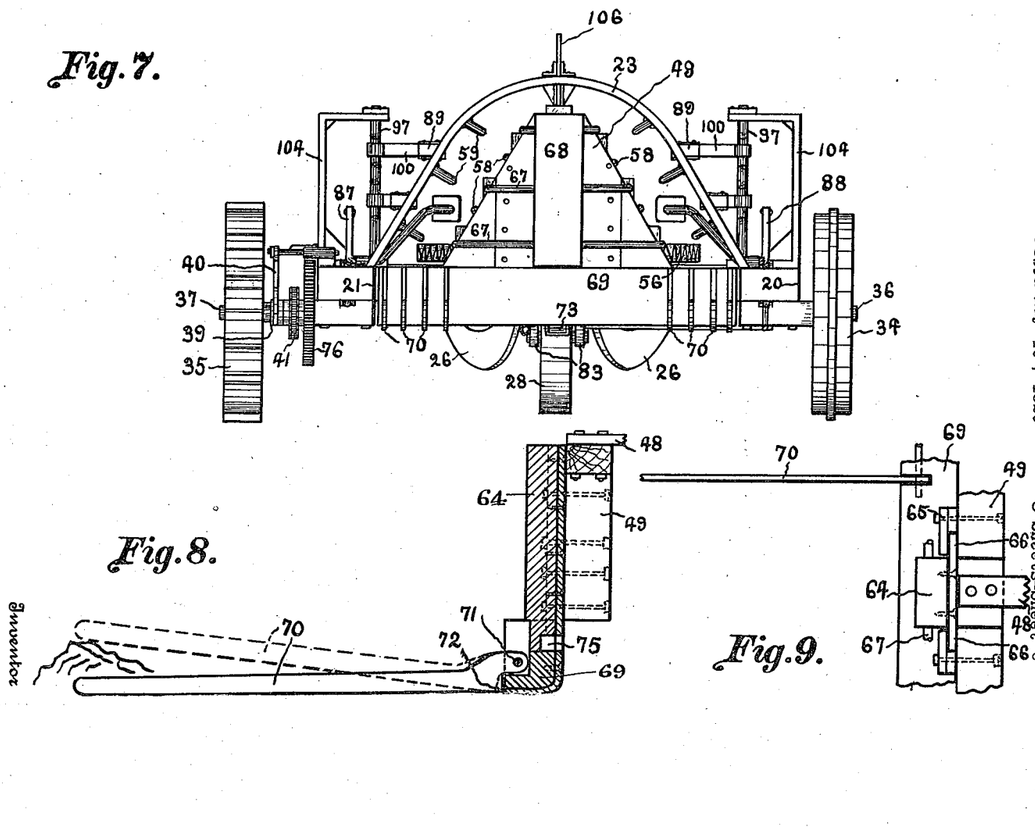
Figure 7 is a rear elevation of the machine.
Figure 8 is an enlarged, detail, partly in section, of the shock support, the dotted lines showing the tines of the support elevated to pass over obstructions in the field.
Figure 9 is a fragmentary, top plan view of the same.
Figure 10:
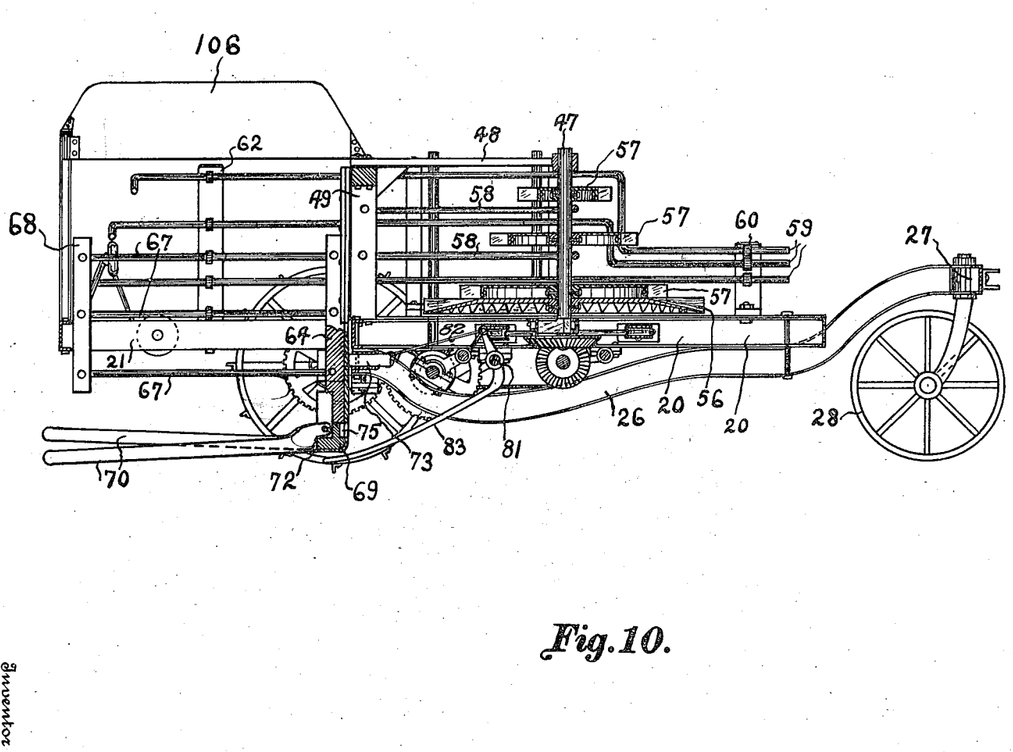
Figure 10 is a vertical, longitudinal section taken through the machine substantially on the line 10—10 of Figure 2.
Figure 11:
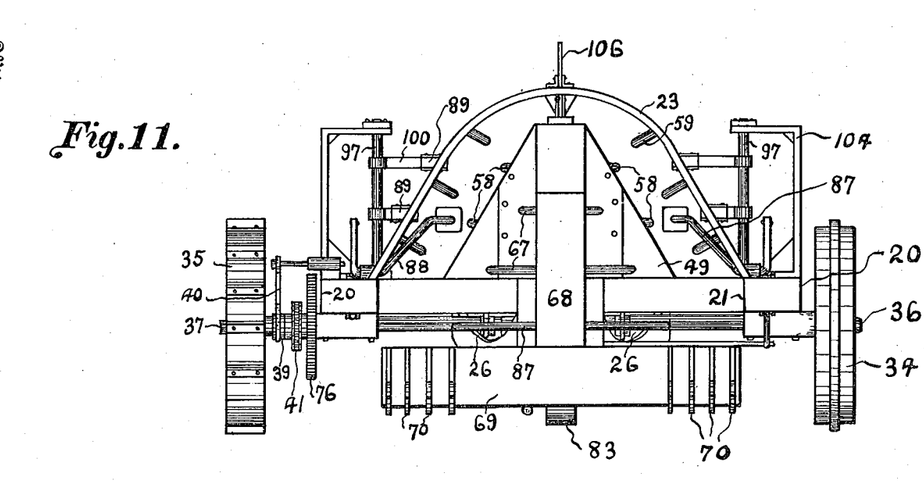
Figure 11 is a rear elevation of the machine, showing the stacker platform in a partially lowered position.
Figure 12:
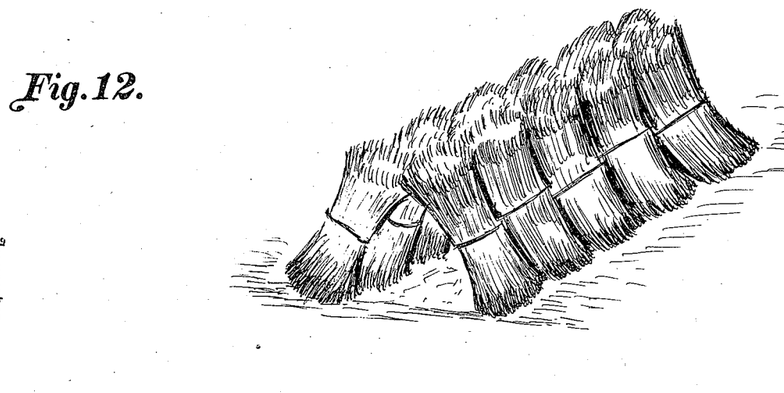
Figure 12 is a perspective view of a section of a shock of grain straw.

The rear end of the machine is provided with a dumping platform and shock holder and former which comprises a vertically movable bar 64 slidably mounted upon the rear side of the triangular post 49. As shown in Figure 9, the post 49 is provided with undercut guides 65 adapted to receive the opposite projecting ends or flanges 66 of a plate secured against the forward side of the post 64. The post 64 is provided with a plurality of vertically spaced-apart supporting rods 67 which extend from opposite sides of the post to the outer edge of the upwardly tapering post 49, and are thence bent rearwardly to form continuations of the inner sides of the throats of the machine. The rear ends of the rods 67 are bent inwardly toward each other and are secured in the opposite sides of a rear post 68 supported by the rods 67 and movable therewith when the post 64 is slid upon the guides 65. This inner support and former is adapted to provide a hollow interior for the shock formed against the opposite sides of the rods 67 and this former is adapted at times to be moved down to allow the shock to slide from the rods 67. The post 64 carries a cross beam 69 upon its lower end which extends substantially the entire width of the rear end of the machine and which carries a plurality of pivoted tines 70 at points beneath the throats of the machine, and the tines 70 are clustered together at such points to form forks or open bottoms for the throats to support the bundles in the throats and to allow the lower ends of the bundles to project more or less through the bottoms of the throats for contact with the ground, as will subsequently appear. These tines 70 are pivoted on rods 71 carried by the cross beam 69 and have shoulders 72 adapted to abut the rear face of the beam 69 for holding the tines 70 normally horizontal. The pivots 71 permit the tines 70 to be lifted up over projections, as shown in dotted lines in Figure 8, so that the machine may travel over such projections without injury to the machine.

The shock former and dumping platform are normally held in raised position by a bolt 73, which is mounted in a suitable casing on the bottom of the upwardly tapering post 49, and a spring 74 normally urges the bolt 73 against the rear side of the vertically movable post 64, and the bolt enters a keeper or slot 75 in the forward side of the post 64 when the latter is elevated to normal position. The means for retracting the bolt to lower the former and the platform at the rear end of the machine comprises a gear wheel 76 on the stub axle 37, which meshes with a second gear wheel 77 mounted on a transverse shaft 78 arranged beneath the frame of the machine. The gear wheel 77 has a pin 79 projecting outwardly and eccentrically from the gear wheel for striking an arm 80 on a transverse rock shaft 81 carried beneath the frame and which is connected by a cord 82 with the bolt 73. The rock shaft 81 also carries a lifting arm 83 which projects rearwardly and beneath the transverse beam 69 for elevating the latter after the shock has been deposited on the ground. The gear wheels 76 and 77 are so proportioned with respect to the traction wheel 35 that the dumping platform is carried forwardly a distance sufficient to fully clear the deposited shock before the pin 79 strikes the arm 80 to lift the dumping platform back to normal position. As the gear wheels 76 and 77 are continuously operated during the movement of the machine, the bolt 73 and the lifter 83 are actuated at stated intervals, and thus the dumping platform would be dropped before a full shock would be formed. To prevent this, a latch 84 is provided which is pivoted to the under side of the frame and normally projects under tension of a spring 85 beneath the transverse beam 69 to hold the dumping platform elevated even when the bolt 73 is retracted. The latch 84 is connected by a cable 86 to a latch lever 87 of substantially bell crank formation and which projects up into the rear end of the throat at the left side of the machine, so that when the shock is completed the pressure of the bundles in the throat forces the lever 87 rearwardly and trips the latch 84. When the latch 84 is thus tripped, and held by pressure of the bundles, the next operation of the bolt 73 releases the dumping platform and the shock may then be dumped. The rear end of the throat at the right side of the machine, or that side which is first packed with the bundles of grain, is provided with an upwardly projecting trip lever 88 adapted to be engaged by the rearmost bundle and swung rearwardly. The lever 88 is connected to the flexible connector or cord 54 and is adapted to draw the same for shifting the clutches 44 and 45 to cause the rotating platform 56 to operate in a reverse direction.

The feeding mechanism delivers the bundles first to one throat at the right side of the machine, and then when the right side is filled the feeder is reversed and caused to fill the other side of the machine. It is necessary to provide means for packing or crowding the bundles together to provide a compact mass, so that the mass, in the form of a shock, will assume the desired form and may stick together when delivered on the ground. The invention, therefore, provides two or more packers 89 at each side, and the packers are operated from the transverse shaft 78, which traverses the under side of the frame. The shaft 78 carries a pair of clutches 90 and 91 connected to a shiftable sleeve or tube 92, slidable on a transverse guide rod 93. The sleeve 92 is urged by spring 94 in one direction to interlock the clutch 91 and release the clutch 90. Freely rotatable on the shaft 78 are bevel pinions 95, one for each clutch 90 and 91, and which mesh with corresponding pinions 96 carried on the lower ends of vertical shafts 97, which rise through the frame. The shafts 97 are adapted to be operated one at a time, and a cord 98 is connected to the sleeve 92 for operation in a direction counter to the spring 94 for shifting the sleeve 92 and interchanging the positions of the clutches 90 and 91. The cord 98 is connected to the flexible connector 54, so that as the latter is drawn taut for changing the direction of rotation of the feeder, the packers will be correspondingly changed, one to remain at rest and the opposite end to begin operation.

Figure 1:
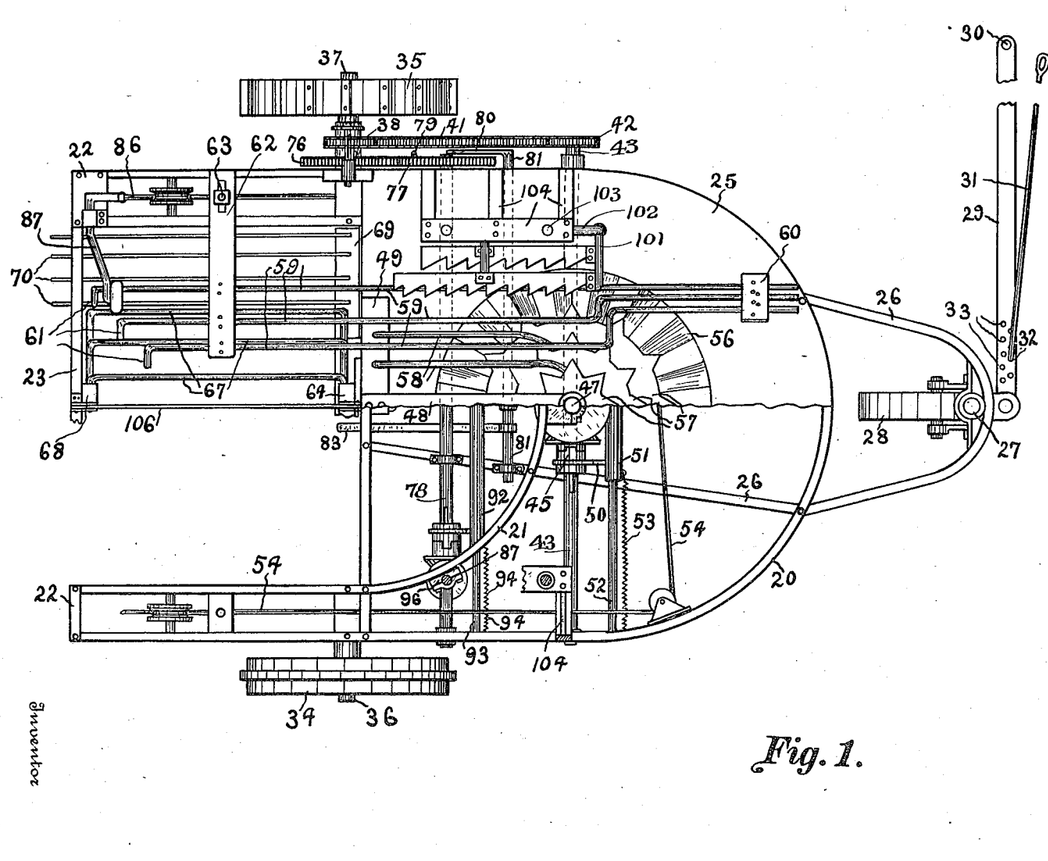
Figure 1 is a top plan view of a grain shocker constructed according to the present invention, parts being broken away to show the mechanism at the under side of the machine.
Figure 2:
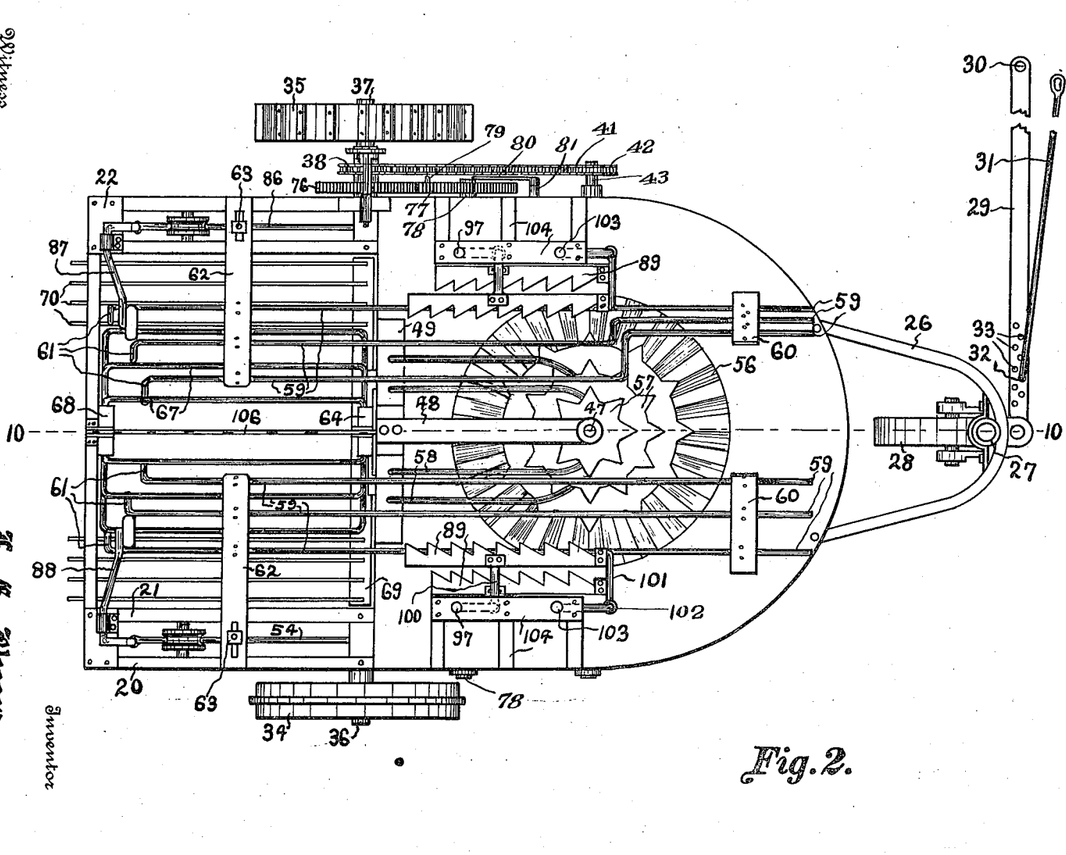
Figure 2 is a complete top plan view of the machine.
Figure 3:
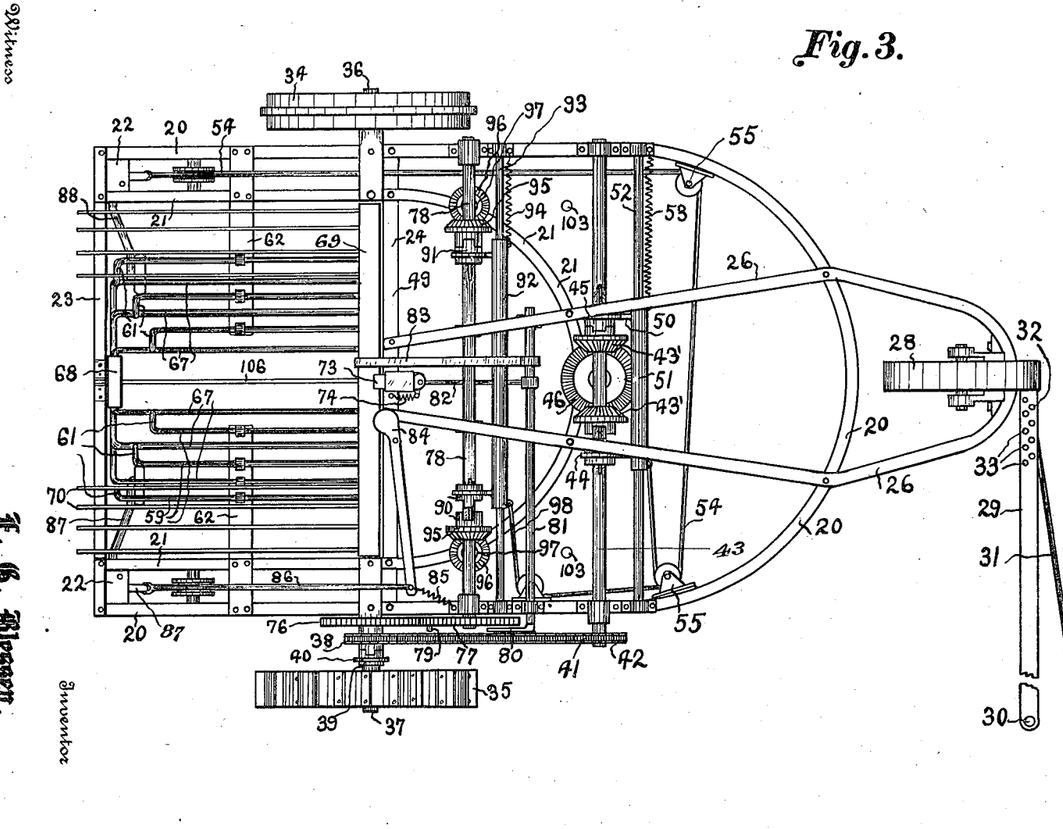
Figure 3 is a bottom plan view of the machine.
Figure 4:
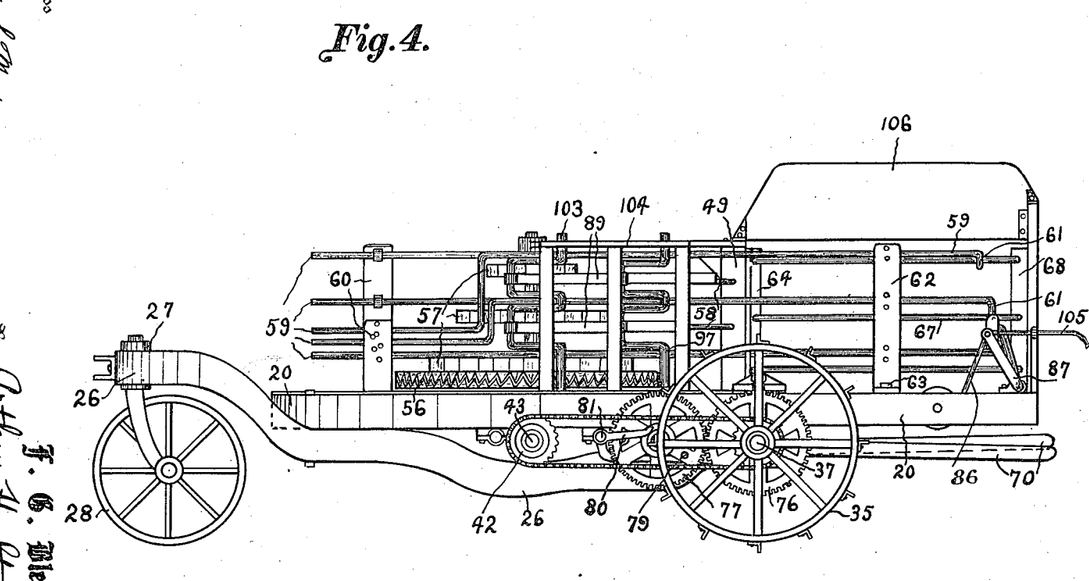
Figure 4 is a side elevation of the machine, showing the stacker platform in raised position.
Figure 5:
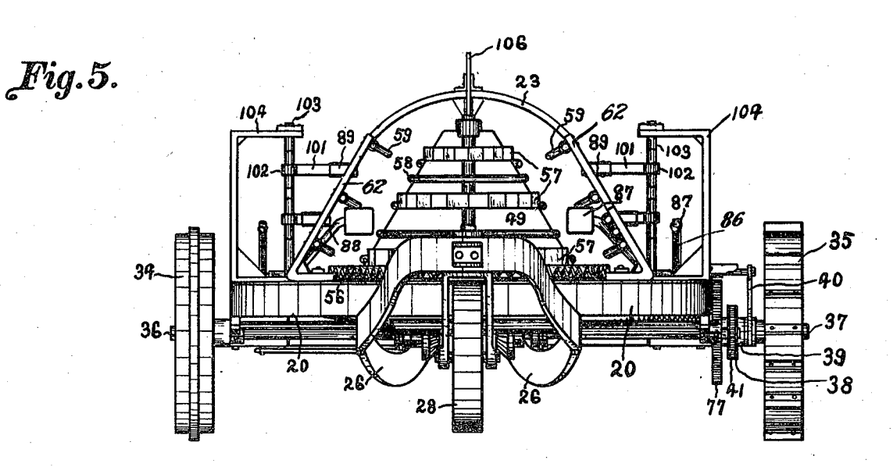
Figure 5 is a front elevation of the grain shocker.
Figure 6:
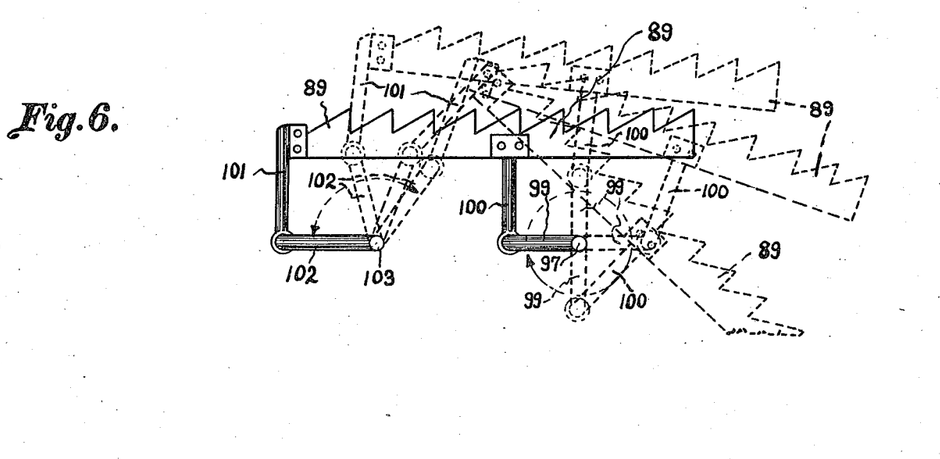
Figure 6 is a detail view of one of the packers employed for crowding the bundles of grain together in the form of a shock.

As best shown in Figure 6, the vertical shaft 97 is provided with a crank 99 for each packer 89 employed. The crank 99 is provided with a connecting bar 100 mounted on the crank and fixed to the inner edge of the packer. The packer is in the form of a bar of suitable length having rearwardly facing ratchet teeth of desired depth for engaging in the sides of the bundles of grain for the purpose of forcing the same rearwardly in the adjacent throat of the machine for crowding the bundles together with considerable pressure. The connecting rod 100 is secured rigidly upon the packer 89 about midway of the length thereof, and the forward end of the packer is provided with a second connecting rod 101 which is pivoted to a crank 102 of an idler shaft 103 mounted vertically in the frame and having bearing at its lower end in the platform or apron 25 and at its upper end in an overhanging bracket 104. From Figure 6 it will be noted that the crank 102 is of greater length than the crank 99, so that as the crank 99 is driven continuously in one direction to make a complete turn, the crank 102 will be reciprocated back and forth to give the desired oscillating movement to the forward end of the packer bar. The cranks 102 and 99 are so arranged relatively that the packer bar is brought against the side of an adjacent bundle of grain and is advanced toward the grain and rearwardly so as to carry the bundle with the packer and push it back into the throat of the machine. The cranks then withdraw the packer by moving the forward end of the packer bar outwardly toward the side of the machine and then drawing outwardly the inner end of the packer bar so that the teeth or serrations of the bar are caused to disengage the stacks of the grain without damage thereto or without withdrawing any of the bundles in the throat of the machine. As shown in the drawings, there is disposed a pair of these packer bars at each side of the machine and the packer bars are located rearwardly of the central transverse plane of the feeder so as to catch the bundles as they are delivered from the feeder and continue the movement of the bundles back through the throat of the machine. The bundles are thus forced rearwardly in the inclined ways or throats and are consecutively caught by the packers and forced backwardly so as to crowd the bundles together and cause them to pack into snug engagement and within a relatively small space.

For the purpose of permitting the operation of dumping before a complete shock is formed on the dumping platform, a hand rope 105 is connected to the trip lever 87, admitting of the manual operation of the lever prior to the complete filling of the machine.

From the above it is thought that the operation of the device will be apparent, for by means of the tongue 29 and rod 31 the machine is adapted to be secured to the tongue of a binder and reaper to be drawn along with the same. As the reaper, or other machine, operates it delivers the bundles upon the rotating platform 56 of the shocker, and, as the platform turns toward the right side of the machine the bundles are carried in the right throat and are engaged between the guide bars at the right side of the machine, which hold the bundles in an inwardly tilted or inclined position on the rotatable platform, and the latter feeds the bundles into the path of the packers 89. The packers 89 now engage the bundles and force the same rearwardly in the throat of the machine until sufficient of the bundles have been packed in the throat to engage the rearmost bundle against the trip lever 88. When the trip lever 88 is pressed back and held in such position by the weight of the bundles packed in the throat, the trip lever draws the cable 54 to shift the sleeve 51 and reverse the direction of the revoluble platform and the feeders which operate in conjunction therewith. The bundles delivered to the platform 56 are thus now carried to the left side of the machine, and, by means of the packers 89 thereat, are forced into the left throat until the latter is filled. As soon as the left throat is filled, the rearmost bundle engages the trip lever 87 and causes the latch 84 to move out of the path of the dumping platform. When the latch 84 is out of the path of the platform, the next operation of the pin 79 against the arm 89 causes the rock shaft 81 to trip the bolt 73 and permit the movable platform with its shock to drop into a position adjacent the ground. The lower ends of the stems of the bundles of grain engage the ground and frictionally hold the shock still while the machine travels forwardly and withdraws the tines 70 from beneath and from within the lower ends of the bundles. The machine moves forwardly a predetermined distance sufficient to clear the shock, when the pin 79 operates upon the rod 81 to swing the lifter 83 upwardly and return the dumping platform into its initial position and ready for receiving another load.

From the drawings it will be noted that the rearmost bundles will be inclined upwardly and forwardly, and at the same time be inclined inwardly. The shock is made up of two opposed rows of closely packed together bundles of grain with their upper ends converging toward each other and resting against a supporting plate 106 which projects upwardly in the central plane of the machine and which is adapted to separate the opposed rows of bundles while the latter are being packed and slid rearwardly between the guide rods. This prevents damage to the grain incident to any rubbing of the bundles against one another during the packing operation. When the bundles are packed in one side of the machine and the trip lever 88 is operated, not only is the feeding of the bundles changed from the right to the left side of the machine, but also the sleeve 92 is shifted to change the positions of the clutches 90 and 91, and the packers at the right side of the machine are released and allowed to rest while the shaft 78 is connected to the packers at the left side of the machine so as to operate the latter only.

It is, of course, understood that various modifications and changes may be made in the details of construction and design and in the size, proportion and materials used in the construction of the above specifically described embodiment without departing from the spirit of this invention, such changes and modifications being restricted only by the scope of the following claims.

What is claimed is:—

1. A grain shocker comprising a frame having opposite side channels, feeding means for delivering bundles to one of the channels, means operable upon the filling of said channel to reverse the operation of the feeding means for delivering bundles to the other channel, alternately operable packers for the channels to pack the bundles therein and controlled in operation by the filling of the first channel, and shock dumping means operable upon the filling of the second channel for delivering the packed rows of grain on the ground in interstacked relation.

2. A grain shocker comprising a frame, spaced rows of guide rods arranged at opposite sides of the frame in position to form upwardly converging and longitudinally extending channels at opposite sides of the frame, a revoluble platform adapted to receive bundles of grain, operating means for turning the platform in one direction to deliver the bundles of grain to one of said channels, a packer for said channel adapted to engage the bundles from the platform and force the bundles rearwardly in the channel, shifting means operable upon the filling of the first channel with bundles to change the direction of rotation of said platform, whereby bundles may be fed into the other channel, a packer for said other channel, means operable upon the filling of the first channel for operating the second packer to force the bundles rearwardly in the second channel, and means for dumping the opposed rows of bundles arranged in the channels with the upper ends of the bundles converging toward each other.

3. A grain shocker comprising a frame, a rotatable platform on the front end of the frame having a serrated upper face adapted to receive bundles of grain thereon, guide rods arranged at opposite sides of the frame in spaced apart relation to form channels at the opposite sides of the frame, means for turning the platform in one direction to feed bundles into one of said channels, shifting mechanism connected to the platform for turning the same in the other direction upon the filling of the first channel to direct bundles into the second channel, packers for the channels connected to said shifting means for forcing the bundles rearwardly first in the first channel and subsequently in the second channel, a shock former mounted on the rear end of the machine in line with said channels to receive the packed bundles and maintain the same with their upper ends converging and in position for contact, and shock dumping means operable upon the filling of the second channel to drop the opposed rows of bundles on the ground and with the bundles of the opposed rows tilting toward each other.

4. A grain shocker comprising a wheeled frame, guiding means arranged at opposite sides of the frame to form independent channels thereat, a shock former mounted on the rear end of the frame with upwardly converging sides in line with said channels, feeding means on the forward end of the frame for receiving bundles, operating means for actuating the feeder in one direction to fill one of said channels, a shifting lever projecting into said channel to receive the bundles thereagainst when the channel is filled and adapted to reverse the movement of the feeder for delivering bundles to the other channel, and a trip lever mounted in said other channel in position to receive the bundles thereagainst when the second channel is filled and adapted to release the shock former for depositing the opposed rows of grain upon the ground in the form of a shock.

5. In a grain shocker, a wheeled frame, a rotatable platform and feeder mounted on the forward end of the frame, transmission means between a wheel of the frame and said platform and feeder for driving the same normally in one direction, forming means for one side of a shock carried on one side of the frame, a second forming means for the other side of a shock carried on the other side of the frame, delivering means adapted to deliver bundles to both of said forming means from the platform and feeder, shifting means connected to the transmission means for reversing the direction of turning of the platform and feeder to feed bundles first to one shock forming means and then to the other forming means, and means for dumping the bundles of grain in the form of a shock simultaneously from both of said forming means.

6. In a grain shocker, a frame, wheels supporting the frame, a feeder on the forward end of the frame, stacking devices on opposite sides of the frame, means for operating the feeder to fill one of the stacking devices, means operable upon the filling of said stacking device to reverse the operation of the feeder for filling the other stacking device, means for lowering the stacking devices when filled for dumping the stacked bundles, and means movable with the stacking devices for holding the bundles in opposed rows during the dumping operation.

7. A grain shocker comprising a wheeled frame, a shock former vertically movable on the rear end of the frame, a lock for holding the shock former raised, means operable by a wheel of the frame for releasing the lock from said shock former at predetermined times, retaining means carried by the frame and engaging the shock former to prevent downward movement thereof under normal retraction of the lock, and means operable upon the filling of the shock former for releasing said latch and permitting the dropping of the shock former when released by the lock.

8. In a grain shocker, a wheeled frame, guide bars arranged in spaced pairs along opposite sides of the frame, feeding means on the forward end of the frame for receiving bundles, means operated by a wheel of the frame for feeding bundles to the guide bars at one side of the frame, shifting means operable upon the filling of said side of the machine with bundles, whereby to reverse the operation of the feeder and deliver bundles to the guide bars at the other side of the machine, means for arranging the bundles in opposed rows, means for supporting the bundles with their upper ends inclined toward each other, and means for releasing the rows of bundles upon the filling of the second side of the machine for depositing the bundles on the ground, said bundles being adapted to be delivered with their upper ends in contact for interbracing the shock.

9. In a grain shocker, a frame, guide rods arranged along opposite sides of the frame and converging upwardly to form opposite side channels in the frame, a platform adapted to receive bundles of grain, means for operating the platform in opposite directions to direct the bundles of grain into said channels, a packer for each channel, shifting means controlling the operation of the packers and operable with the platform for filling first one channel and subsequently filling the second channel, and means for dumping the opposed rows of bundles in the channels with the upper ends of the bundles converging toward each other.

In testimony whereof, I have affixed my signature in presence of two witnesses.

FREDERICK G. BLESSEN.

Witnesses:
ARTHUR H. STURGES,
HIRAM A. STURGES.